(12) United States Patent
Klun et al.

(10) Patent No.: US 6,299,187 B1
(45) Date of Patent: Oct. 9, 2001

(54) STEERING ASSEMBLY FOR MEANS OF TRANSPORT

(75) Inventors: Franco Klun, Avenza; Paolo Rossi, Reggio Emilia, both of (IT)

(73) Assignee: Fantuzzi-Reggiane S.p.A. (IT)

( * ) Notice: Subject to any disclaimer, the term of this patent is extended or adjusted under 35 U.S.C. 154(b) by 0 days.

(21) Appl. No.: 09/499,858

(22) Filed: Feb. 7, 2000

(30) Foreign Application Priority Data

Feb. 10, 1999 (IT) .............................................. MO99A0019

(51) Int. Cl.[7] ...................................................... B60G 9/02
(52) U.S. Cl. ......................................... 280/98; 280/124.117
(58) Field of Search ................................. 280/98, 124.11, 280/124.117, 124.118

(56) References Cited

U.S. PATENT DOCUMENTS

| | | | |
|---|---|---|---|
| 1,940,798 | * | 12/1933 | Hanna ..................................... 280/98 |
| 2,437,823 | * | 3/1948 | Jonkhoff ................................. 280/98 |
| 2,848,244 | * | 8/1958 | Georgi ................................... 280/98 |
| 3,591,203 | * | 7/1971 | Steiner ................................... 280/98 |
| 5,207,443 | * | 5/1993 | Mitchell ................................. 280/98 |
| 5,240,286 | * | 8/1993 | Vandenbark et al. ................... 280/98 |
| 5,392,872 | * | 2/1995 | Ducote ................................... 280/98 |
| 5,987,671 | * | 11/1999 | Heimbrock et al. .................... 280/98 |

* cited by examiner

Primary Examiner—Brian L. Johnson
Assistant Examiner—Matthew Luby
(74) Attorney, Agent, or Firm—Wolf, Greenfield & Sacks, P.C.

(57) ABSTRACT

A steering assembly for means of transport comprises at least one truck supported by a supporting structure which is rigidly coupled to the means of transport and has, in an upward region, a central center bearing for the coupling of at least one axle so as to allow rotation about a vertical axis; the axle has, at its two ends, wheels which rest on the ground or on another support; the wheels are provided with electric or hydraulic motors or the like which are controlled by an electric and/or electronic control device and are adapted to produce the rotation of the axle.

7 Claims, 6 Drawing Sheets

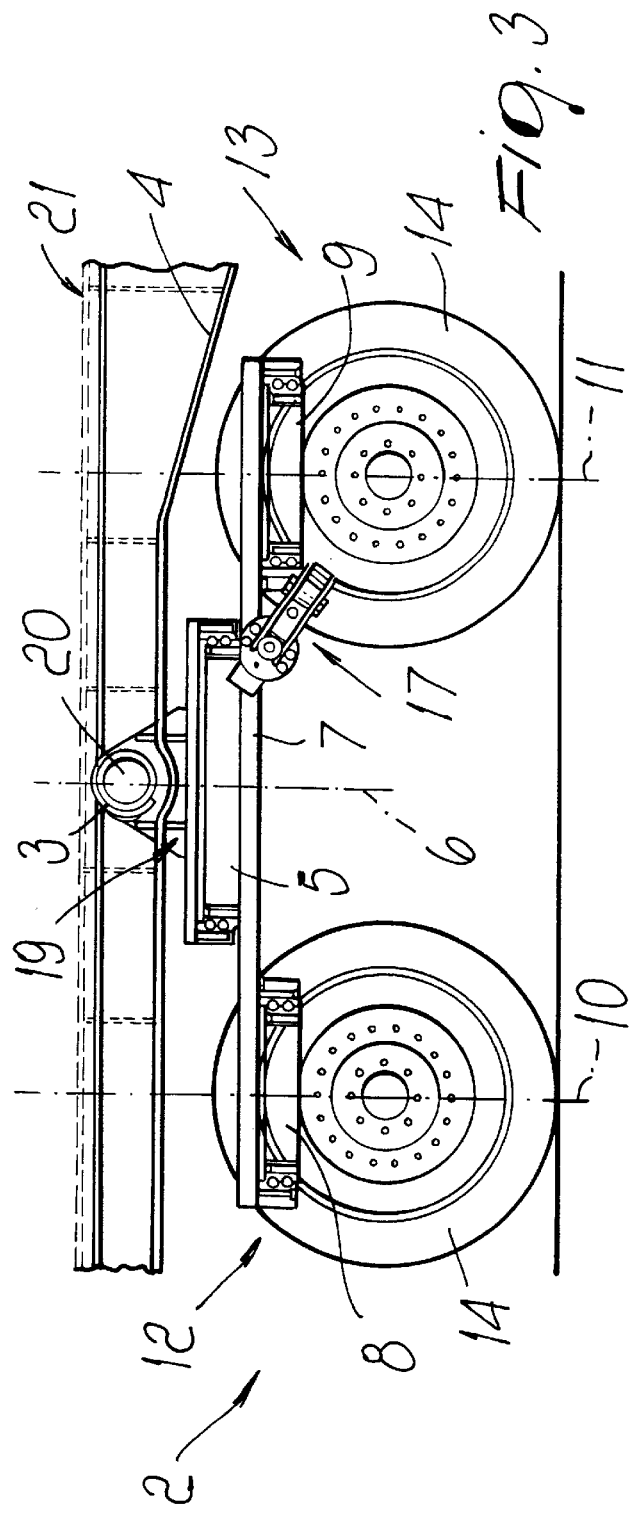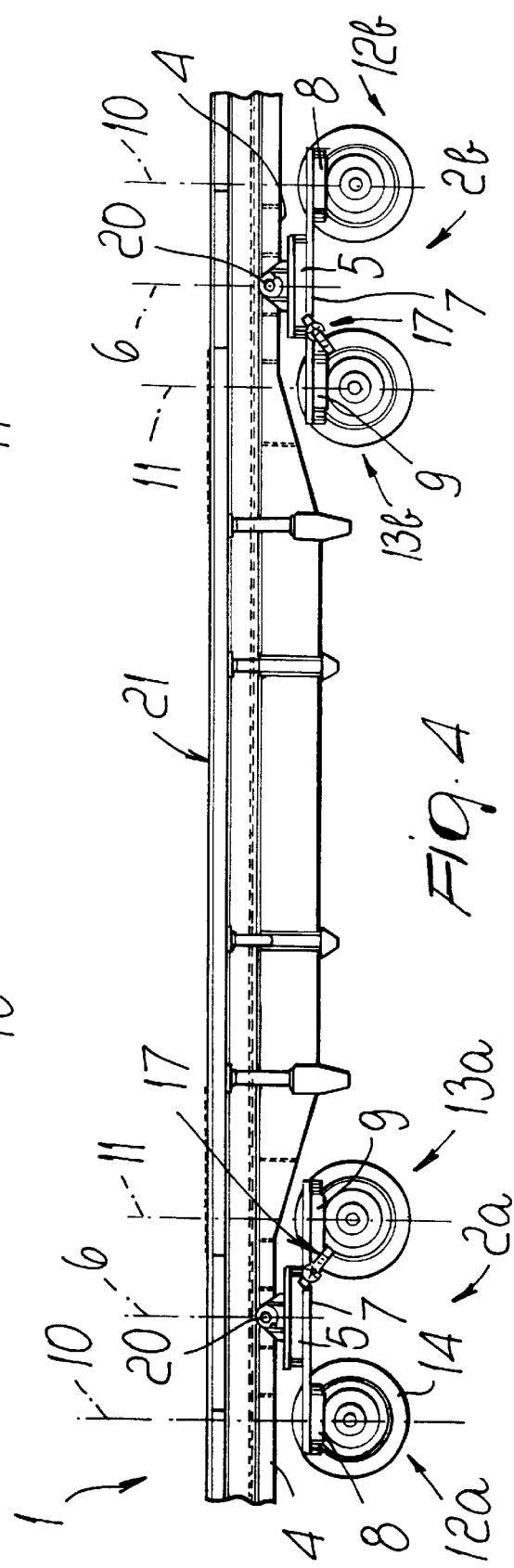

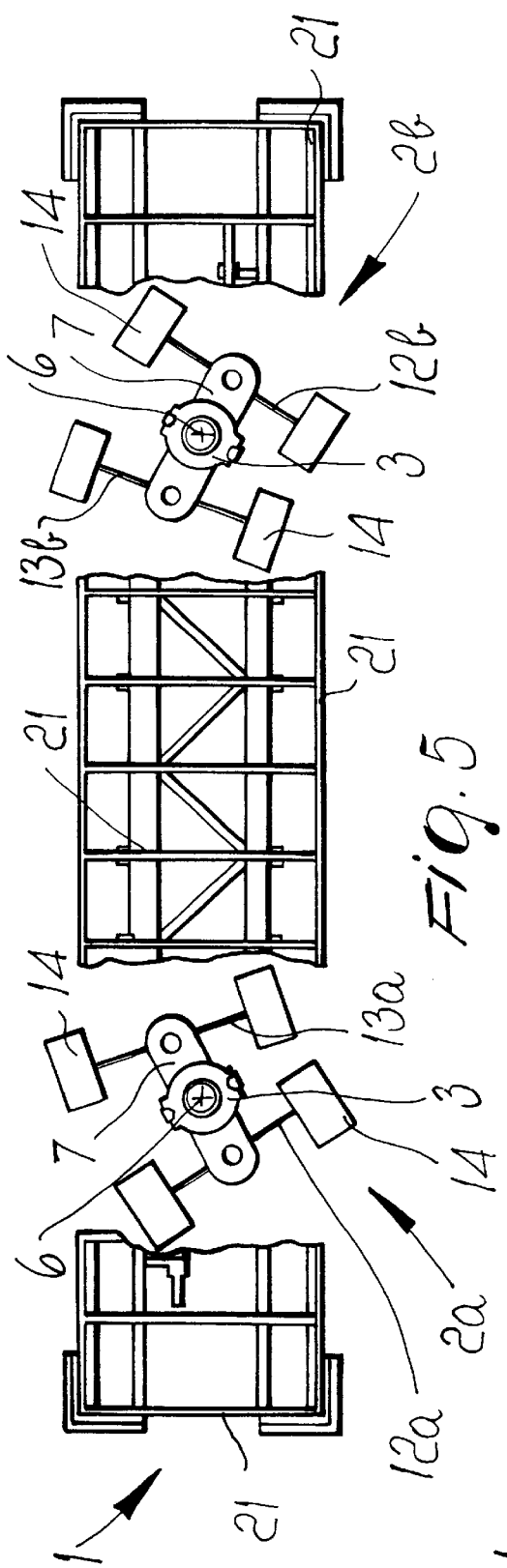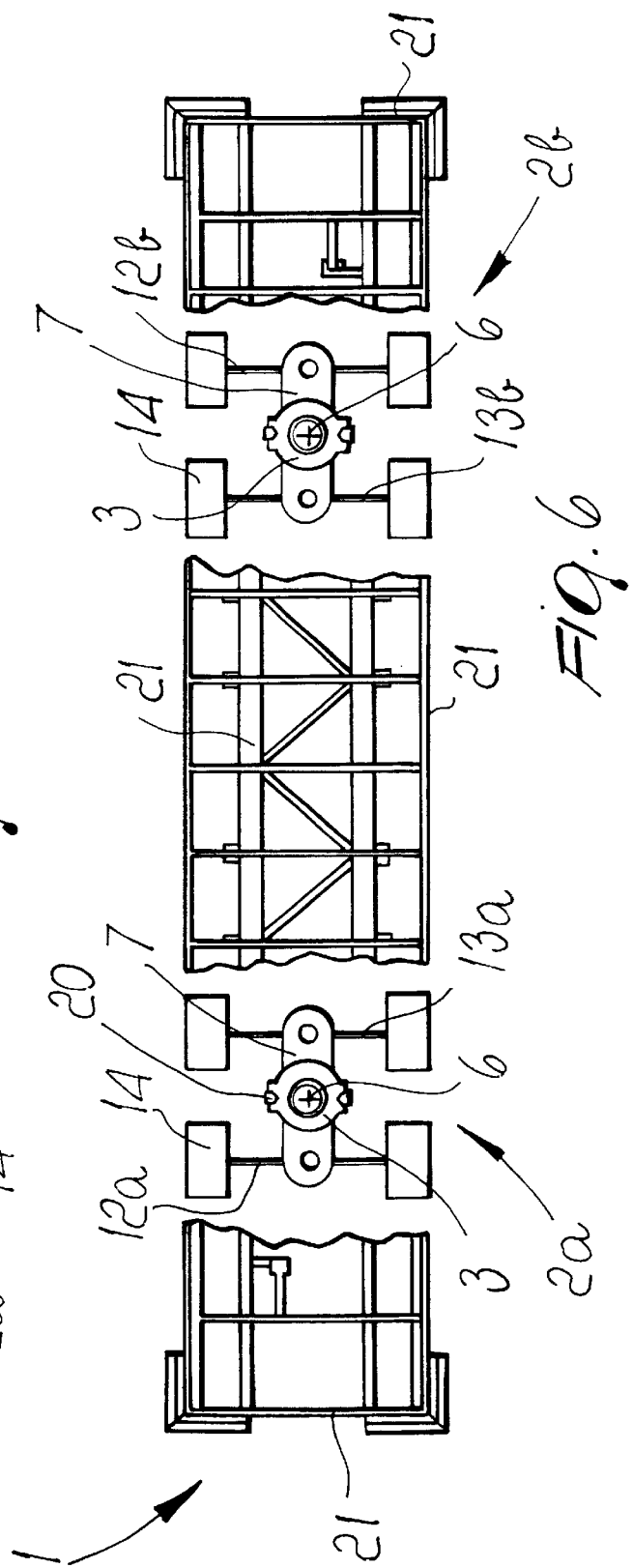

STEERING ASSEMBLY FOR MEANS OF TRANSPORT

CROSS-REFERENCE TO RELATED APPLICATIONS

This application claims priority to Italian Application Ser. No. M099A000019 filed Feb. 10, 1999, the disclosure of which is incorporated herein by reference.

BACKGROUND OF THE INVENTION

The present invention relates to a steering assembly for means of transport.

In the field of the means of transport for people, goods and animals, driven by an onboard and/or remote operator or automatically, without an operator, conventional steering systems are used, which are constituted by a set of mechanical and hydraulic elements, such as racks, pinions and/or cylinders, which steer the wheels about vertical axes and allow the means of transport to change direction.

However, these systems are not devoid of drawbacks, including the fact that they do not allow the simultaneous rotation of the wheel pairs of the two or more axles, which are connected to each other with respect to the vertical axis passing through the centerline of each axle.

Moreover, the means of transport provided with these steering systems require considerable turning space, since their pairs of front and rear wheels necessarily trace curves having a different radius. In fact, when steering of the front wheels begins, the means of transport advances together with the rear axles, whose wheels therefore do not trace the same curve as the front ones.

SUMMARY OF THE INVENTION

The aim of the present invention is to eliminate the above-noted drawbacks of the conventional types of steering system, providing a steering assembly for means of transport which allows the simultaneous steering of two or more axles, allows to trace curves having a constant or variable radius and minimizes turning space requirements.

Within the scope of this aim, an object of the present invention is to provide a structure which is simple, relatively easy to provide in practice, safe in use, effective in operation and has a relatively low cost.

This aim and this object are both achieved by the present steering assembly for means of transport, characterized in that it comprises at least one truck supported by a supporting structure, which is rigidly coupled to the means of transport and has, in an upward region, a central center bearing for the coupling of at least one axle so as to allow rotation about a vertical axis, the axle having, at its two ends, wheels for resting on the ground or on another support, the wheels being provided with electric or hydraulic motors or the like which are controlled by electric and/or electronic control means and are adapted to produce the rotation of the axle.

BRIEF DESCRIPTION OF THE DRAWINGS

Further characteristics and advantages of the present invention will become apparent from the following detailed description of a preferred but not exclusive embodiment of a steering assembly for means of transport, illustrated only by way of non-limitative example in the accompanying drawings, wherein:

FIG. 3 is a partially sectional schematic side view of a truck of the steering assembly according to the invention;

FIG. 4 is a partially sectional side view of a portion of the means of transport on which two trucks of the steering assembly according to the invention are fitted;

FIG. 5 is a schematic plan view of the chassis of a means of transport provided with two trucks of the steering assembly according to the invention in the configuration for travelling along a bend;

FIG. 6 is a schematic plan view of the chassis of the means of transport of FIG. 5 in the configuration for travelling along a straight line;

DESCRIPTION OF THE PREFERRED EMBODIMENTS

Figure 1:
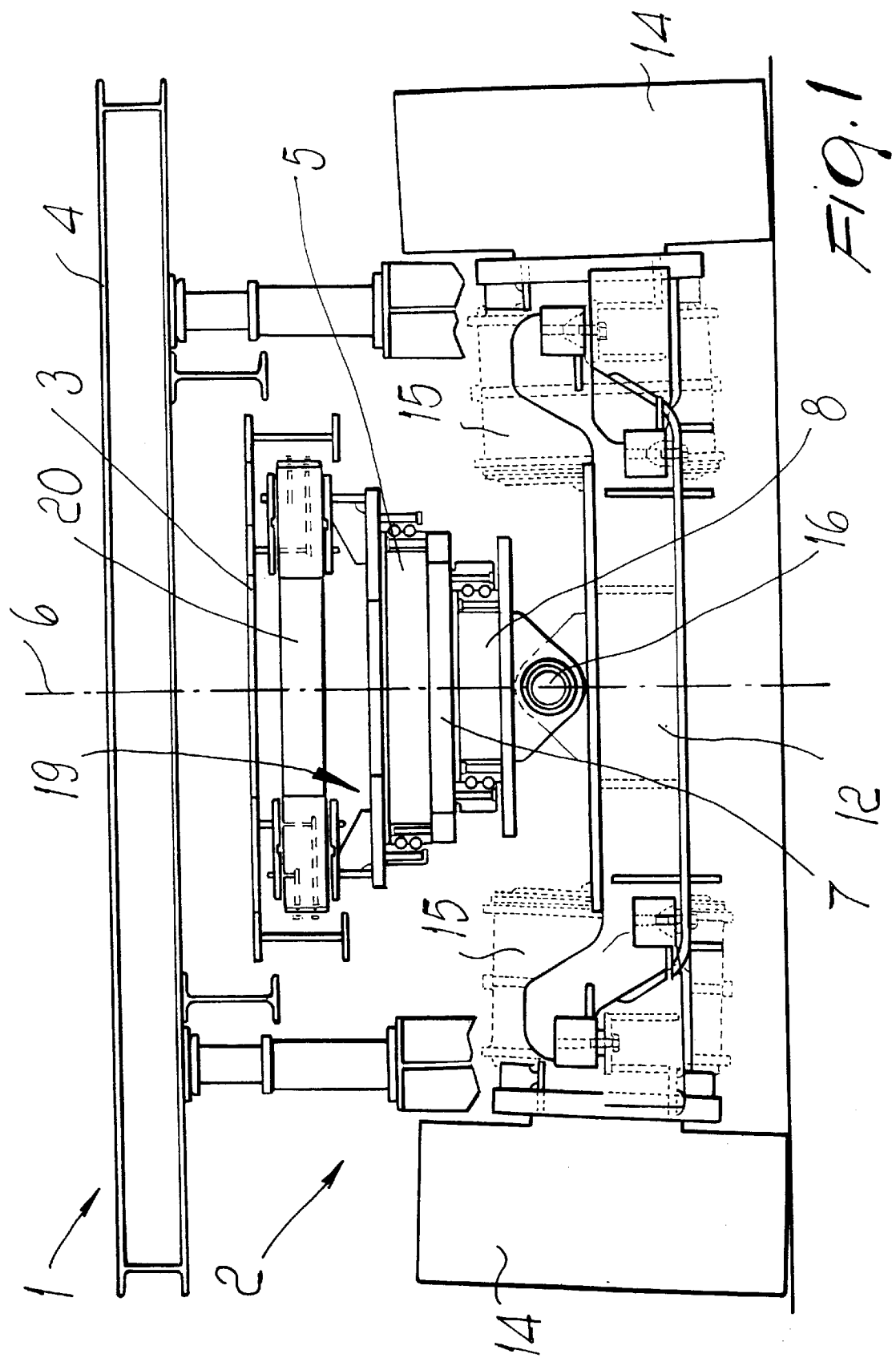
FIG. 1 is a partially sectional front view of the driving axle of a steering assembly for means of transport according to the invention.

With reference to the above-cited figures, 1 generally designates a steering assembly for means of transport.

The steering assembly 1 is constituted by one or more trucks 2, each of which is supported by a supporting structure 3 which supports the chassis 4 of the means of transport.

The structure 3 has, in a downward region, a central center bearing 5 for the coupling of a longitudinal member 7 so as to allow rotation about a vertical axis 6; the longitudinal member has a central axis of rotation and has, at its two ends and in a downward region, a front center bearing 8 and a rear center bearing 9.

The two center bearings 8 and 9 are the supports, capable of rotating about the respective vertical axes 10 and 11, of two axles 12 and 13 which rotate about their own centerline and are provided, at their two ends, with respective wheels 14 which rest on the ground or on another support.

The wheels of the first axle 12 have electric motors 15 or, as an alternative, hydraulic motors or the like, which are controlled by electric and/or electronic control means, not shown, which produce the simultaneous rotation of the longitudinal member 7 and of the two axles 12 and 13.

In FIG. 4 there are two trucks 2, a front one 2a and a rear one 2b, and the pairs of wheels 14 of the axles of each truck, designated by 12a, 13a and 12b, 13b respectively, trace curves which have the same constant or variable radius.

In each truck 2, the wheels of the first axle 12 are provided with the motors 15 and the axle is coupled to the center bearing 8 by means of a first horizontal pivot 16 which is perpendicular to the axles and allows the axle to oscillate transversely.

Advantageously, the wheels of the second axle 13 are provided with respective braking means 17 which are constituted by conventional disk brakes 18 or the like.

Figure 2:
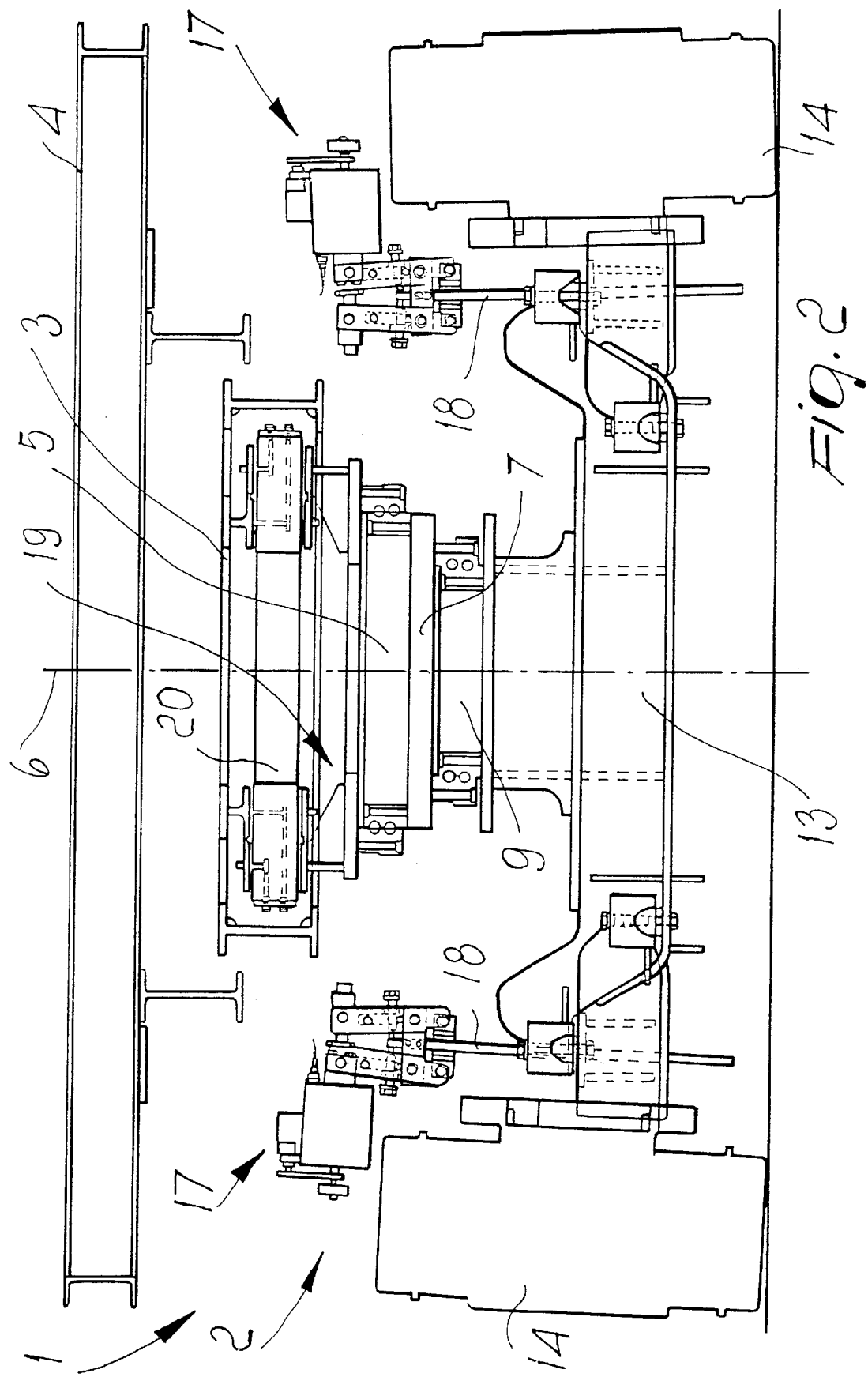
FIG. 2 is a partially sectional front view of a second axle of the steering assembly according to the invention.

In FIG. 2, the axle 13 is rigidly coupled to the center bearing 9, but as an alternative it is possible to provide a second horizontal pivot which is perpendicular to the axles, is similar to the first pivot 16 and allows the transverse oscillation of the second axle 13.

The central center bearing 5 of the truck 2 has, in an upward region, means 19 for coupling to a central pivot 20 which is horizontal and substantially parallel to the axles, is connected to the supporting structure 3 and allows the truck to oscillate on a longitudinal plane.

The propulsion system and the braking system are of course not constrained by the presence of the pivots.

The two axles of each truck 2 are mutually articulated so as to allow each one to rotate about its own vertical axis which is normal to the geometric axis that connects the centers of the wheels 14.

The central center bearing 5 allows the entire truck 2 to rotate with respect to an axis which lies at right angles to, and on the centerline of, the plane traced by the axles.

The two axles 12 and 13 of each truck are mutually connected mechanically or by way of other systems, such as sets of teeth and the like, having the same function, so that their rotation occurs reciprocally and simultaneously: i.e. while one axle turns in one direction, the other axle simultaneously turns in the opposite direction by the same angle and with the same speed, acceleration or deceleration.

Conveniently, the articulation of the two axles to the supporting surface 21 of the means of transport is such that the steering of the two axles is fully independent of the position of the surface.

The electric, hydraulic or other motors 15 can be connected to the wheels of both axles of each truck 2 (one motor for each wheel); direction changing, i.e. steering, is provided with simultaneous control of the torque and of the rotation rate of the motors 15, differentiating the speeds by means of an electric and/or electronic control of the analog and/or digital type.

In an alternative embodiment, not shown, between the front center bearing 8 and the rear center bearing 9 of each truck 2 it is possible to insert one or more additional center bearings which are the supports of respective axles which can rotate about the vertical axes that pass through the centerline.

The mechanical connection between the axles of a same truck allows to align the geometric axes of each pair of wheels of each axle with the radii of the curve being traced, so as to allow minimal dragging of the wheels on the ground, since the path of the wheels is normal to the radius of the curve being traced.

In the case of a means of transport with two or more trucks 2, management of the movement of the axles allows, with an adapted electric and/or electronic control program, to position the wheels 14 in order to perform combined advancement and rotary motions.

Figure 7:
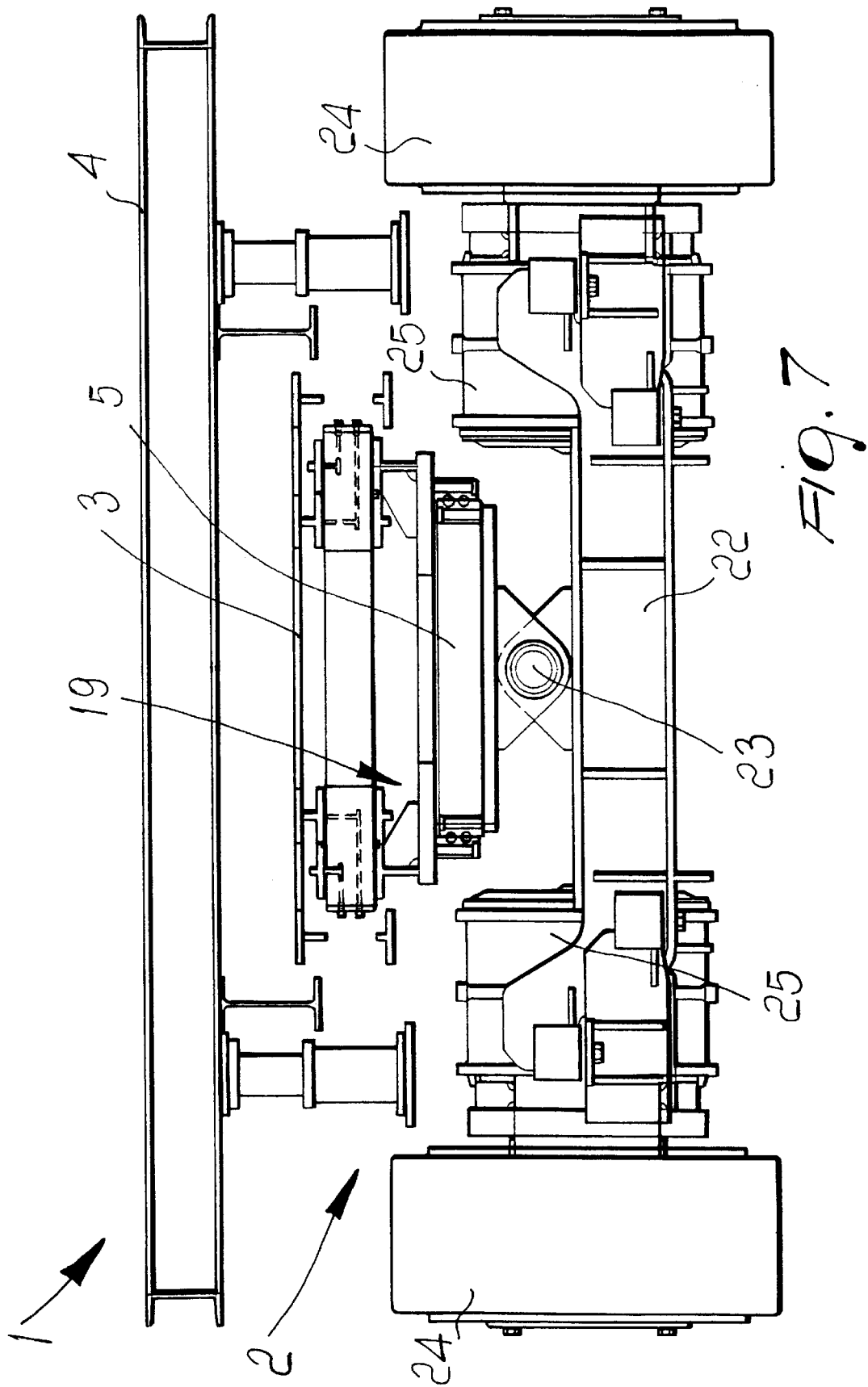
FIG. 7 is a partially sectional front view of an alternative embodiment of a truck of the steering assembly according to the invention.
Figure 8:
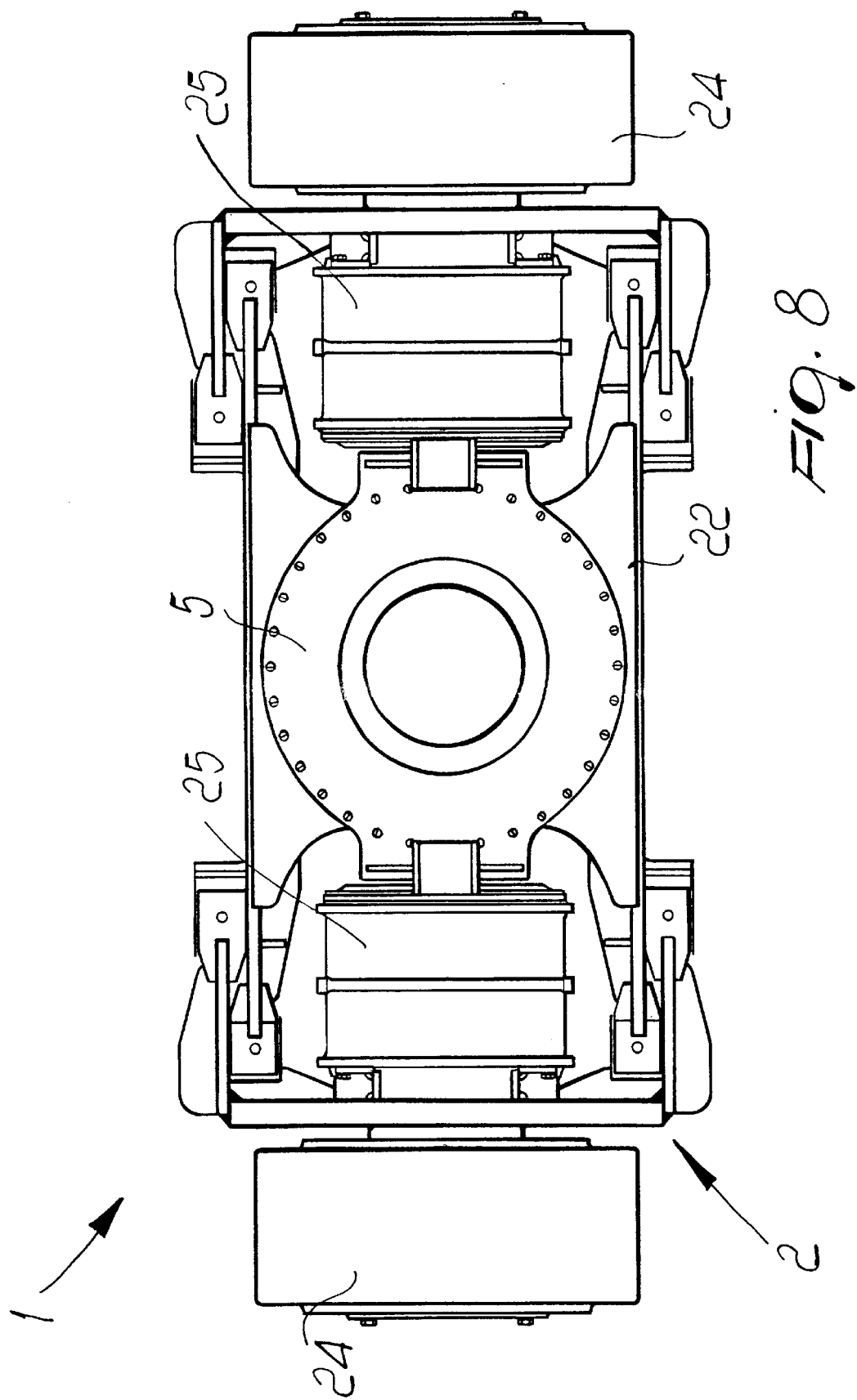
FIG. 8 is a plan view of the truck of FIG. 7.

FIGS. 7 and 8 illustrate an alternative embodiment of a truck 2 of the steering assembly 1; in this case, the truck does not have the longitudinal member and the central center bearing supports a single rotating axle 22.

The axle 22 is coupled to the center bearing 5 by means of a horizontal pivot 23 and has, at its two ends, wheels 24 which are in turn provided with motors 25 for the rotation of the axle.

In practice it has been observed that the above-described invention achieves the intended aim and object, i.e. to allow steering of the means of transport by virtue of electric, hydraulic or other motors which directly actuate one or more pairs of wheels without using mechanical devices, to allow to simultaneously turn the mutually connected axles and to allow rotations of the means of transport along bends, minimizing space occupation and wheel dragging.

Another characteristic of the invention is that the axles can be connected to the supporting structure so as to create degrees of freedom between the axles and the structure.

The steering assembly according to the invention can further be applied to means of transport with a driver, to remotely controlled means of transport, and to means of transport provided with an automatic driverless control system.

The invention thus conceived is susceptible of numerous modifications and variations, all of which are within the scope of the inventive concept.

All the details may further be replaced with other technically equivalent ones.

In practice, the materials employed, as well as the shapes and the dimensions, may be any according to requirements without thereby abandoning the scope of the protection of the appended claims.

The disclosures in Italian Patent Application No. MO99A000019 from which this application claims priority are incorporated herein by reference.

What is claimed is:

1. A steering assembly for means of transport, comprising: at least one truck; a supporting structure for supporting said at least one truck, and which is rigidly coupled to the means of transport; at least one axle; a central center bearing arranged at an upward region of said supporting structure for coupling of said at least one axle so as to allow rotation thereof about a vertical axis; wheels arranged at ends of said at least one axle for resting on a supporting surface; an actuation provided by any of an electric and a hydraulic motor, said actuation being adapted to produce rotation of said at least one axle;

a longitudinal member supported by said central center bearing: said at least one axle including two axles; and, in a downward region of said longitudinal member at opposite ends thereof, at least one front center bearing and at least one rear center bearing for supporting said two axles so as to allow rotation about vertical axes which pass each through a respective centerline of said axle, with at least the wheels of the first one of said axles being provided with said actuation, and wherein said actuation is adapted to produce combined and coordinated rotation of the longitudinal member and of the two axles.

2. The assembly of claim 1, comprising two trucks, a front one and a rear one, with pairs of wheels arranged on respective axles of each truck being adapted to follow curves with curvature radii being, according to requirements, equal to each other, different from the other, constant and variable.

3. The assembly of claim 2, comprising: for each truck, a first horizontal pivot for connecting said first axle to the respective center bearing, said first horizontal pivot being perpendicular to said first axle so as to allow transverse oscillation thereof; and braking means, provided at the wheels of the second one of said axles.

4. The assembly of claim 3, comprising a second horizontal pivot, said second axle being coupled to the respective center bearing through said second horizontal pivot which is perpendicular to said second axle and allows transverse oscillation thereof.

5. A steering assembly for means of transport, comprising: at least one truck; a supporting structure for supporting said at least one truck, and which is rigidly coupled to the means of transport; at least one axle; a central center bearing arranged at an upward region of said supporting structure for coupling of said at least one axle so as to allow rotation thereof about a vertical axis; wheels arranged at ends of said at least one axle for resting on a supporting surface; an actuation provided by any of an electric and a hydraulic motor, said actuation being adapted to produce rotation of said at least one axle;

a central pivot, said central center bearing having, in an upward region, coupling means for coupling to said central pivot which is horizontal and substantially parallel to said at least one axle and allows oscillations of said at least one truck on a longitudinal plane.

6. The assembly of claim 1, wherein said actuation is adapted to differentiate torques and rotation rates of said wheel motors for producing clockwise and respectively, counterclockwise rotation of said axles.

7. The assembly of claim 3, comprising, a plurality of center bearings providing rotary support about respective vertical axes.

* * * * *